United States Patent [19]

Burr

[11] Patent Number: 4,516,641

[45] Date of Patent: May 14, 1985

[54] EARTH BORING BIT WITH PRESSURE COMPENSATING RIGID FACE SEAL

[75] Inventor: Bruce H. Burr, Houston, Tex.

[73] Assignee: Hughes Tool Company-USA, Houston, Tex.

[21] Appl. No.: 542,801

[22] Filed: Oct. 17, 1983

[51] Int. Cl.³ .................... E21B 10/08; F16J 15/16
[52] U.S. Cl. ............................ 175/228; 175/372; 277/92; 384/94
[58] Field of Search .............. 175/227, 228, 229, 371, 175/372, 359, 367; 384/94; 277/91, 92, 83, 84

[56] References Cited

U.S. PATENT DOCUMENTS

| | | | |
|---|---|---|---|
| 2,590,759 | 3/1952 | Dale et al. | 277/92 |
| 3,075,781 | 1/1963 | Atkinson | 277/83 |
| 3,180,648 | 4/1965 | Kupfert | 277/8.2 |
| 3,216,513 | 11/1965 | Robbins | 175/227 |
| 3,397,928 | 8/1968 | Galle | 308/8.2 |
| 3,403,916 | 10/1968 | Durham | 277/92 |
| 3,452,995 | 7/1969 | Engelking | 277/92 |
| 3,524,654 | 8/1970 | Hasselbacher | 277/92 |
| 3,656,764 | 4/1972 | Robinson | 277/92 |
| 3,761,145 | 9/1973 | Schumacher | 308/8.2 |
| 4,014,595 | 3/1977 | Dolezal | 308/8.2 |
| 4,019,785 | 4/1977 | Stinson | 308/8.2 |
| 4,077,634 | 3/1978 | Durham | 277/92 |
| 4,087,100 | 5/1978 | Yoshihashi et al. | 277/92 |
| 4,176,848 | 12/1979 | Lafuze | 277/92 |
| 4,276,946 | 7/1981 | Millsapps | 175/228 |
| 4,421,327 | 12/1983 | Morley et al. | 277/92 X |
| 4,466,622 | 8/1984 | Deane et al. | 277/92 |

OTHER PUBLICATIONS

William C. Maurer, Patent Search and Review on Roller-Bit Bearing Seals & Lubricant Systems, Dept. of Energy, Oct. 14, '75, pp. 71–103.
R. R. Hendrickson, Support Research for Development of Improved Geothermal Drill Bits, Dept. of Energy, Jun. 1977, pp. 63–68.
Catepillar Parts Book D10 Tractor, etc., Nov. 1978, pp. 171–174.

Primary Examiner—Stephen J. Novosad
Assistant Examiner—Michael Starinsky
Attorney, Agent, or Firm—Robert A. Felsman

[57] ABSTRACT

An earth boring bit having a cantilevered bearing shaft and a compensator system to equalize the pressure of the lubricant with the hydrostatic pressure of the drilling fluid surrounding the bit. A rigid face seal assembly, positioned between the cutter and bearing shaft of the bit, moves axially in response to, and to compensate for, dynamic pressure changes in the lubricant adjacent the seal. This is accomplished by the positioning and sizing of resilient energizer rings in relationship to the geometries of the mating grooves between the cutter and shaft and the rigid sealing rings of the face seal assembly.

12 Claims, 7 Drawing Figures

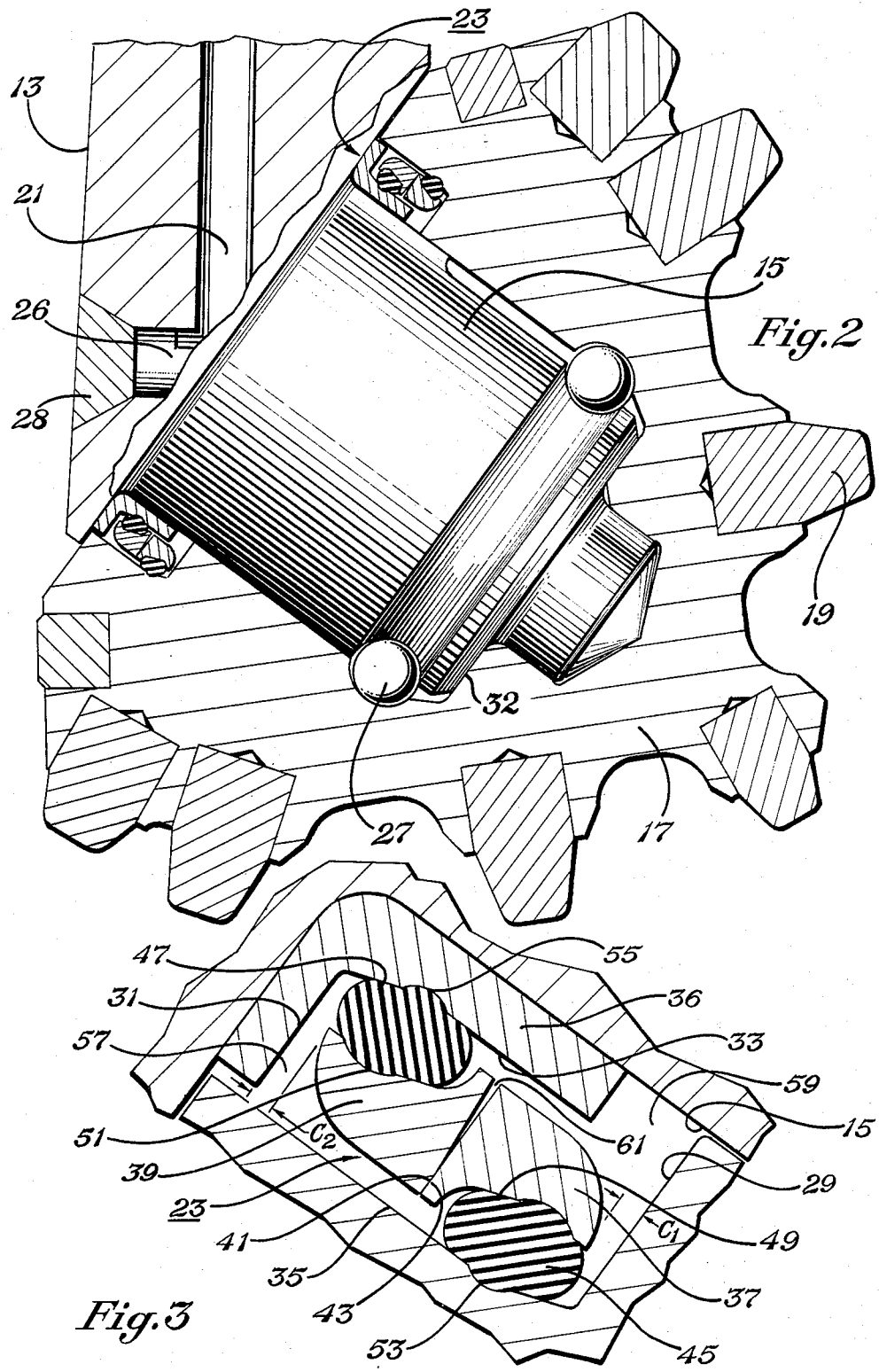

EARTH BORING BIT WITH PRESSURE COMPENSATING RIGID FACE SEAL

BACKGROUND OF THE INVENTION

This invention relates to earth boring bits, lubricated with a system which inclues a hydrostatic pressure compensator to balance the internal pressure of the lubricant inside the bit with the hydrostatic pressure of a liquid drilling fluid that surrounds the bit during drilling. In this combination, the specific improvement relates to the seal assembly between each cutter and bearing shaft which confines lubricant within, and excludes contaminates from, the lubrication system.

DESCRIPTION OF THE PRIOR ART

As a bit bores through the earth, it experiences increasingly higher pressures and temperatures, while the abrasives that surround the bit create extremely destructive conditions. Howard R. Hughes, Sr., invented the first commercially successful cantilevered rolling cutter bit in 1909 (U.S. Pat. No. 930,759), which did not have a seal, as such, but had a piston type pressure lubricator that urged a heavy grease continuously from the lubricating system into the bearings and ultimately into the borehole. The grease was expended rapidly, by modern standards, but was sufficient to make the first Hughes bit an instant success. His bit replaed the blade or "fish-tail" bit, because it would drill through hard rock with relative ease. It was the "rock bit" that led the way for an impressive surge in the drilling of oil wells with the rotary method.

Almost continuously since Hughes first tested and then commercialized his rock bit, designers tried to develop successful seals to add life to the bearings. Examples of some efforts of the past may be seen in a report prepared for the Department of Energy, "Patent Search and Review on Roller-Bit Bearing Seals and Lubrication Systems", by William C. Maurer, Oct. 14, 1975.

The limited success of early efforts to seal journal bearing bits was a key in the development of the unsealed, ball and roller bit. This bit, or the many variations which it spawned, was the predominantly successful bit of the 40's and the 50's, lasting into the 60's, when Gerald O. Atkinson, et al, perfected the first seal capable of sealing, for long periods, lubricant inside the bearings of the then modern anti-friction bit (U.S. Pat. No. 3,075,781).

The large, concentrated loading on individual balls and/or rollers, and on the raceways, produced spalling and fatigue failures. The Atkinson seal added significantly to the life of the ball and roller bearings in rock bits by delaying this spalling action. Eventually, attention returned to the journal bearing.

If the journal bearing could be sealed, it should have greater strength and load carrying capacity than the antifriction bearing. The Atkinson seal would not seal lubricant inside the bit for a period greater than maybe fifty or sixty hours on the average. Rapid or dynamic pressure surges in the lubricant near the seal in the bearing caused the lubricant to leak. The pressure surges were caused by the rapid movements of the cutter on the bearing shaft during drilling, and were unavoidable due to the necessity of providing some clearances between the bearing parts for assembly of the bits during manufacture. The movements can be axial, but more likely, are complex and wobbling.

The potential of the journal bearing was unlocked by Edward M. Galle, who provided an o-ring, journal bearing combination that could last longer than one hundred hours in the hard, slow drilling of West Texas. Galle's o-ring sealed, journal bearing bit (U.S. Pat. No. 3,397,928) became the predominant bit in the market place, but the o-ring seal has limitations that may prevent it from being but one more piece in the puzzle of sealing rock bit bearings.

Metal face seals have been used with success for years to seal bearings that must operate in an abrasive environment, such as the track rollers of track-type tractors. One is disclosed in the patent of Bernard F. Kupfert, et al, U.S. Pat. No. 3,180,648, assigned to Caterpillar Tractor Company. This seal is commercially available and is referred to as the Caterpillar "Duo-Cone" seal. This type of Caterpillar seal may be seen in Caterpillar Parts Book, D10 Tractor Powered by D348 Engine, revision publication, November 1978, and is available in a number of forms, including an inverted arrangement shown on pages 173 and 174. A "Duo-Cone" seal has been used successfully to seal bearings in tunnel boring or raise drilling, one form being disclosed in the patent of R. J. Robbins, et al U.S. Pat. No. 3,216,513. Another form of seal is disclosed in another Caterpillar U.S. Pat. No. 3,452,995, an axially compact version that can compensate for a substantial amount of axial shift of the bearings.

The metal face seal is a suggested alternative to the o-ring seal in rock bits, as may be seen from the William C. Maurer report, supra, pages 84–85, which refers to the U.S. patent of Engelking (U.S. Pat. No. 3,452,995). The results of the testing of one metal faced seal used in a rock bit may be seen with reference to another report published by the Department of Energy, "Support Research for Development of Improved Geothermal Drill Bits", by R. R. Hendrickson, et al, pages 65–68. During the testing of a metal face seal patented by Percy W. Schumacher, Jr., U.S. Pat. No. 3,761,145, Hendrickson noted that the pressure surges generated in the lubricant by cutter movement or wobble caused the o-ring used to position the metal ring to be extruded out the back side of the ring. Further, it was noted that design changes made to improve o-ring retention were unsuccessful.

Pressure compensating o-ring seals have been previously tried to simplify bit design and replace the flexible diaphragm compensator, as may be seen in the U.S. patents to George E. Dolezal (U.S. Pat. No. 4,014,595) and to Leon B. Stinson, et al (U.S. Pat. No. 4,019,785).

SUMMARY OF THE INVENTION

The general object of the invention is to provide, in a drill bit having a hydrostatic pressure compensator, a rigid, preferably metal, face seal that moves axially to minimize the dynamic changes in the pressure of the lubricant near the seal when the cutter moves axially or wobbles during drilling. The preferred embodiment of the seal assembly has a pair of annular metal rings having radical sealing faces thrust together with a predetermined force and lubricated through the space between beveled, unengaged portions of the faces. Thrust is provided by a pair of elastomeric energizer seals, preferably o-rings, each of which contacts an inclined or conical, contoured portion of an opposed metal seal ring and an inclined or conical, contoured portion in a groove between the cutter and the shaft. The groove and the seal assembly are sized to permit predetermined axial movement of the assembly to minimize dynamic pressure differentials across the seal caused by movement of the cutter during drilling. The minimum axial width of the groove should be greater than the axial width of the engaged metal rings by a distance related to the axial play of the cutter on the bearing shaft and to the seal and groove geometry to permit unrestricted movement of the metal rings. Other objects, features and advantages of the invention will become apparent in the following detailed description.

DESCRIPTION OF THE DRAWINGS

FIG. 2 is a fragmentary view in longitudinal section of the lower portion of a bit, enlarged with respect to FIG. 1, to better expose the seal assembly.

FIG. 3 is a fragmentary view in longitudinal section of yet another portion of the cutter and bearing shaft, showing the bearing seal assembly enlarged with respect to the illustration of FIG. 2.

DESCRIPTION OF THE PREFERRED EMBODIMENTS

Figure 1:
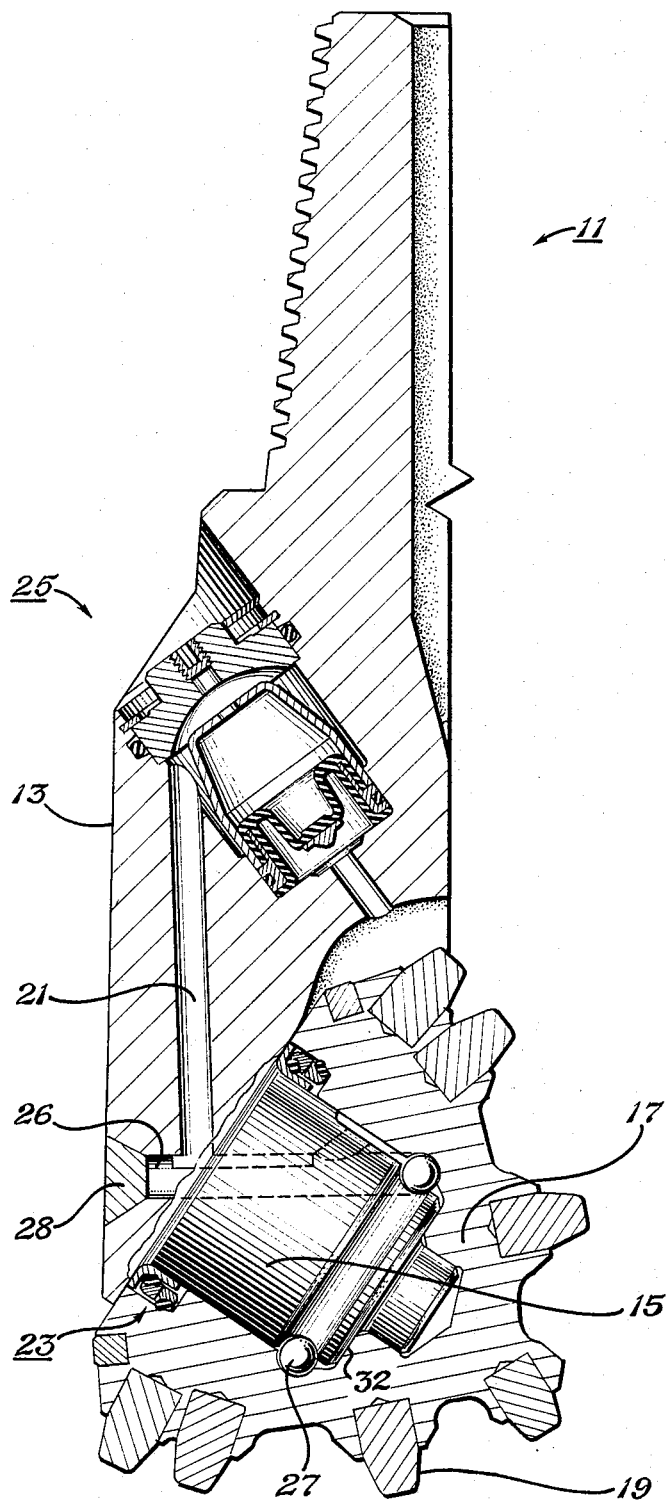
FIG. 1 is a view in longitudinal section of a portion of an earth boring bit, showing the compensator system, bearing shaft, cutter and the field tested embodiment of the seal assembly.

The numeral 11 in FIG. 1 of the drawings designates a lubricated, rotatable cone or cutter type earth boring bit having a body formed in three head sections or legs 13, only one of which is shown. Each leg 13 includes an oblique cantilevered bearing shaft 15 that depends inwardly and downwardly to support a rotatable cutter 17 having earth disintegrating teeth 19. Lubricant passage 21 supplies lubricant to the bearing surfaces between the bearing shaft 15 and cutter 17. A seal assembly 23 retains lubricant in the bearing and prevents borehole fluid from entering the bearing. A hydrostatic pressure compensator is part of a lubrication system 25 connected with the lubricant passage 21 to equalize the pressure of the liquid lubricant inside the bearing with the hydrostatic pressure of the fluid in the borehole. A preferred compensator system is shown in the patent to Stuart C. Millsapps, Jr., U.S. Pat. No. 4,276,946.

The geometry of the bearings on the shaft 15 and within the cutter 17 are of a prior art configuration, including the use of a ball bearing retainer 27, which with a plug 26 welded at 28 retains the cutter on the bearing shaft, preferably as shown in the U.S. patent of Robert A. Cunningham, U.S. Pat. No. Re. 28,625.

Referring especially to FIG. 3, the cutter and shaft include an annular seal groove or gland that has axially spaced, generally radial end walls 29, 31 and inner and outer circumferential walls 33, 35. End wall 31 and circumferential wall 33 are formed upon a seal seat insert 36 secured to the bearing shaft 15.

The seal assembly includes a pair of annular rigid rings 37, 39 with opposed radical faces 41, 43. The pair of rigid, preferably metal, rings have a radially measured thickness less than the annular space between the inner and outer side walls 33, 35 of the groove and an axially measured width which is less than the width or the distance between the end walls 29, 31 of the groove, as will be explained more fully hereafter.

Each of a pair of resilient, energizer rings 45 or 47 extends between a seal seat 49 or 51 on one of the metal rings 37 or 39 and an opposed seal seat 53 or 55 on the inner or outer circumferential walls 33, 35. Each seal seat has an annular groove and configuration to position and retain the associated energizer ring and the metal ring, which is suspended within the groove intermediate the circumferential walls 33, 35 and the end walls 29, 31 to provide clearances $C_1$ and $C_2$ which exist when the thrust surfaces 32 are in contact. The positions of seats 53 and 55 relative to each other are selected such that, at assembly, the initial deflection of each seal half relative to its adjacent end wall 29 or 31 will provide sufficient contact pressure between radial faces 41 and 43 to maintain sealing contact between all the elements of the seal assembly throughout the full range of seal movements permitted by clearances $C_1$ and $C_2$ and the play between cutter and shaft. See U.S. Pat. No. 3,180,648 for a description of an earlier construction of a conical, "Duo-Cone" seal arrangement of the Caterpillar Tractor Company, and U.S. Pat. Nos. 3,403,916, 3,524,654 and 4,077,634 for improvements to such seals.

From FIG. 3 it may be seen that one of the metal rings 37, 39 is inverted with respect to the other, a feature which permits the seal assembly to span the groove diagonally and engage opposite circumferential walls 33, 35. The clearances $C_1$ and $C_2$ are between each of the end walls 29, 31 of the groove and the engaged rigid rings 37, 39. Drilling fluid fills the space 57 and acts upon the outermost side of the seal assembly 23, and lubricant fills the space 59 and acts upon the innermost side of the seal assembly. The rigid rings 37, 39 have a beveled, substantially conical portion on the lubricant side of the seal assembly to define a space 61 to feed lubricant to the engaged radical faces 41, 43, which regenerate inwardly as they wear in service. See U.S. Pat. No. 3,180,648 for a description of one configuration of such seal faces.

Figure 4:
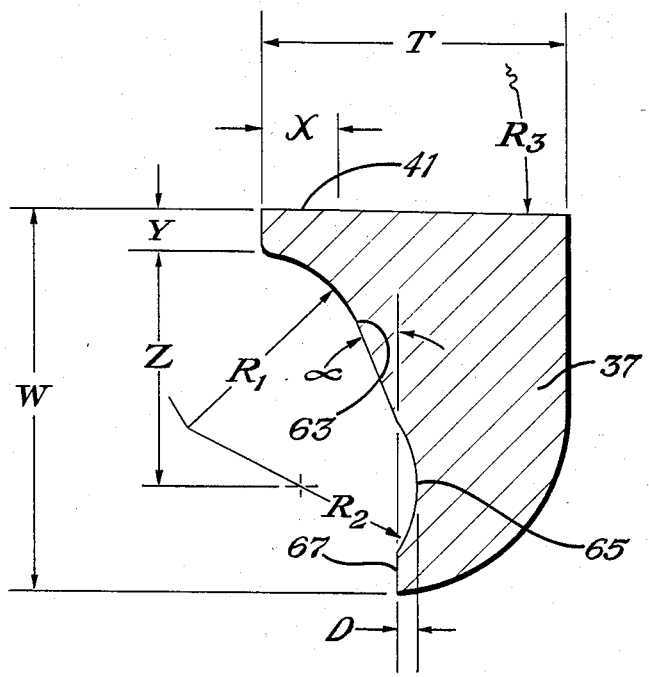
FIG. 4 is an enlarged longitudinal section of one of the rigid rings of the seal assembly.
Figure 5:
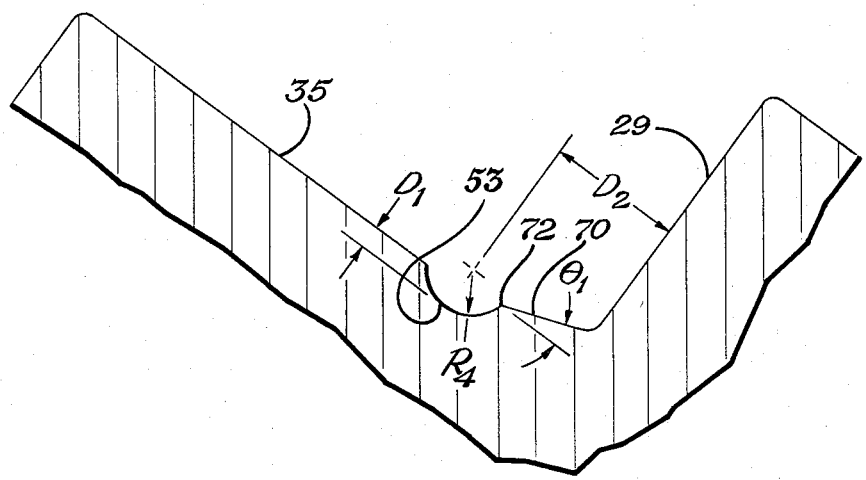
FIG. 5 is a fragmentary, longitudinal section of the seal seat and conical surface seal groove in the cutter.

The dimensions provided below relate to the bit used in the first field test of the invention, which was a "Hughes" 12¼ inch, J22 type bit. With reference especially to FIGS. 4 and 5, the radial thickness T of each of the three metal rings 37 was 0.200 inch, the axial width W was about 0.270 inch and the outside diameter was about 3.449 inches. Angle α was about twenty degrees and the radii $R_1$ and $R_2$ averaged 0.048 and 0.080 inch respectively, $R_1$ being tangent with the conical surface 63. The axial dimensions Y and Z averaged respectively 0.050 and 0.149 inch. The depth D of the positioner groove 65 below the lip 67 averaged 0.009 inch to help position and confine the associated energizer ring 45 during assembly. The radial thickness X of the radial sealing face 41 was about 0.050 inch with a surface finish of about one or two RMS and a tapered surface 68 being defined by a spherical radius $R_3$ of about 80 inches with a surface finish of about two or three RMS.

The inverted and opposing metal rings 39 had a radial thickness T of about 0.199 inch, a radial width W of about 0.247 inch and an outside diameter of about 3.450 inches. Angle α was about 19 degrees, and the radii $R_1$ and $R_2$ were both about 0.075 inch. The axial dimensions Y and Z were about 0.023 and 0.154 inch, the depth D of the positioner groove being about 0.016 inch. There was a flat sealing face on the rings 39 that extended across the entire thickness T of the ring, that had a surface finish similar to that of rings 37.

Ring 37 was purchased from Caterpillar Tractor Company and is one of their standard hard metal alloy rings. Ring 39 was manufactured by Hughes Tool Company specifically for this invention from an air hardening tool steel.

The configuration of the seal seat in the cutter 17 of the bit is shown in FIG. 5. The seal seat was defined by a conical surface 70 having an angle $\theta_1$ of about $19\frac{1}{2}$ degrees, a positioner groove 53 having a radius $R_4$ of about 0.060 inch located a distance $D_2$ of about 0.129 inch from end wall 29, and a depth $D_1$ of about 0.008 inch. The conical surface 70 intersected the groove 53 at a point 72 which was located radially from the surface 35 a distance of about 0.021 inch.

Figure 6:
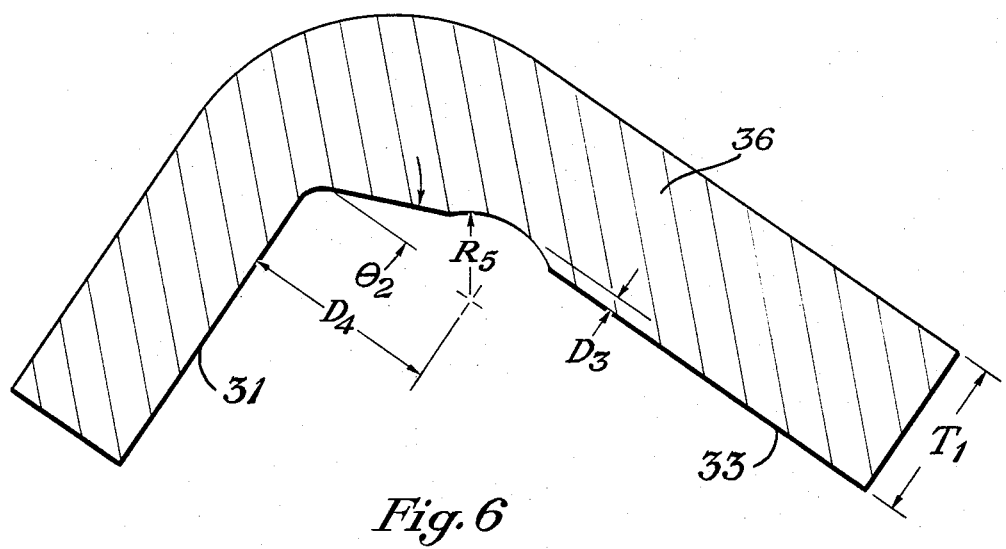
FIG. 6 is a longitudinal section of the seal seat annular insert used on the bearing shaft to form the conical, contoured surface that receives and positions the seal assembly.

A similar configuration was used for the seal seat on the bearing shaft 15, defined in this instance by the seal seat insert 36 shown in FIG. 6 having an axial thickness $T_1$ of 0.105 inch. The positioner groove had a depth $D_3$ of about 0.011 inch, formed by a radius $R_5$ of about 0.060 inch located a distance $D_4$ about 0.140 inch from end wall 31. $\theta_2$ was a conical angle of about 20 degrees located in a manner similar to the conical surface 70 of FIG. 5.

The o-rings or energizer rings 45, 47 after service had a cross-sectional thickness of about 0.168 inch, a hardness of about 59 durometer, Shore A, inside diameters of about 3.057 and 2.760 inches respectively, and a high resilience, measured to be about 43 percent rebound using the above described o-rings and a Shore Resiliometer, Model SR-1. The radial end walls 29, 31 of the seal groove were located a width of about 0.580 inch apart with bearing thrust surfaces 32 in mutual contact. Using the above components, the assembly loading on the faces of the rigid rings was about 40 to 60 pounds, as determined from load deflection curves. The clearances $C_1$ and $C_2$ were respectively about 0.035 and 0.029 inch at assembly with thrust surfaces 32 in contact to define the minimum groove width and the diameters of the circumferential walls 33, 35 were respectively about 2.969 and 3.529 inches.

For the first bit tested, the axial bearing play of each of the cutters, after testing, was:

|  | Axial Play (inch) |
| --- | --- |
| No. 1 Cutter | 0.012 |
| No. 2 Cutter | 0.015 |
| No. 3 Cutter | 0.012 |

In operation, and during drilling in a well bore filled with liquid, the compensator 25 acts to balance the hydrostatic pressure of the liquid in the well bore with the pressure of the liquid lubricant inside the bearing. However, cutter movements during drilling, caused by the complex forces applied to a cutter, and the clearances which are of necessity used to enable assembly of the parts, produce rapid changes in the volume defined by the space 59. The viscosity of the lubricant and flow restrictions between the space 59 and the hydrostatic pressure compensator 25 do not allow compensation for the volume changes in space 59 as rapidly as they occur. Nevertheless, seal assembly 23 will move sufficiently to provide the required volume change and thereby minimize the pressure changes experienced by the seal which would otherwise cause rapid depletion of the lubricant supply or entry of borehole fluids into the bearing, with resulting bearing and seal damage.

Use of the seal assembly 23 described above in a bit which includes a hydrostatic pressure compensator minimizes the pressure differentials to which the seal assembly is exposed through the cooperative relationship of the hydrostatic pressure compensator and the dynamic pressure compensating abilities of the seal assembly. The seal assembly is one which spans diagonally the seal groove such that one of the resilient energizer rings engages a wall of the cutter, while the other energizer ring engages a wall of the shaft. Thus, the outermost portion of each of the energizer rings is exposed to the fluid in the borehole, while an innermost portion of each of the energizer rings is exposed to the lubricant inside the bearing. Every pressure differential is therefore sensed by the seal assembly, which is moved by each such pressure differential. A seal assembly which cannot be moved by the differential pressure cannot effectively compensate for dynamic changes in the volume of space 59. Preferably the seal half consisting of energizer ring 47 and rigid ring 39 should have the same axial load deflection characteristics as the mating half consisting of energizer ring 45 and rigid ring 37 to balance and minimize the increase in the loading of engaged radial faces 41 and 43 caused by pressure differentials.

Another requirement for a satisfactory seal assembly, and the groove in which it is placed, is that the assembly be positioned between the end walls of the groove to permit unrestricted axial movement of the rigid rings between the walls of the groove in response to sensed pressure differentials. If the bearing lubricant could freely enter and leave space 59 as the volume of space 59 is changed by cutter movement, the pressure differentials acting on the seal would be negligible and the movement of the rigid rings would be less than the cutter movement. Furthermore, if the load deflection characteristics of each half were equal, as preferred, the rigid ring movement would be one-half the cutter movement. However, because lubricant movement is restricted, greater rigid ring movement must be provided for. The required clearances $C_1$ and $C_2$ were determined by building a model of the seal, cutter and shaft assembly and measuring the movement of the rigid rings in response to cutter movement with the exit from space 59 blocked; for example, by a conventional o-ring seal between the bearing surfaces of the simulated cutter and shaft. To be sure that accurate rigid ring movement takes place in the model, it is important to have space 59 completely filled with an incompressible fluid that is free of any air or vapor pockets. Further more, in some cases, it may be necessary to pressurize space 57 with air to insure complete rigid ring movement in response to movement of end wall 29 away from end wall 31.

A model as hereinabove described was used to measure the movement of the rigid rings in response to cutter movement for the shaft, cutter and seal used in the first test bit. Air pressure in space 57 was not required for this test because the pressure in space 59 did not drop below the vapor pressure of the fuid used to fill the space. The ratio of rigid ring movement to cutter movement was determined from the measurements to be 1.88:1. This ratio is influenced by the geometry of space 59, the size, shape and elastic properties of the energizer rings and the manner in which the energizer rings are deformed by the rigid rings and wall of the seal groove. Thus, a change in any of these parameters is likely to cause a change in required clearances $C_1$ and $C_2$.

After the ratio of rigid ring movement to cutter movement has been established, as described above, the minimum values for $C_1$ and $C_2$ may be calculated. The maximum seal or rigid ring movement with respect to the bearing shaft is calculated by multiplying the axial play between the cutter and shaft by the ratio of rigid ring movement to cutter movement. When bearing thrust surfaces 32 are in contact, the first axial clearance $C_1$ between rigid ring 37 and the inner wall 29 of the groove should be greater than the maximum rigid ring movement less the axial play between the cutter and the shaft. The second axial clearance $C_2$ between rigid ring 39 and the outer end wall 31 of the groove measured with the thrust surfaces 32 in contact should be greater than a value equal to the maximum rigid ring movement as calculated above less the displacement which rigid rings 37 and 39 undergo when the space between end walls 29 and 31 is increased by axial play from its minimum length to its maximum length in the absence of any pressure differential across the seal. This displacement of rigid rings 37 and 39 in the absence of a pressure differential can be determined with the model if space 59 is vented or it can be calculated with the aid of the load deflection curves for the seal halves.

Figure 7:
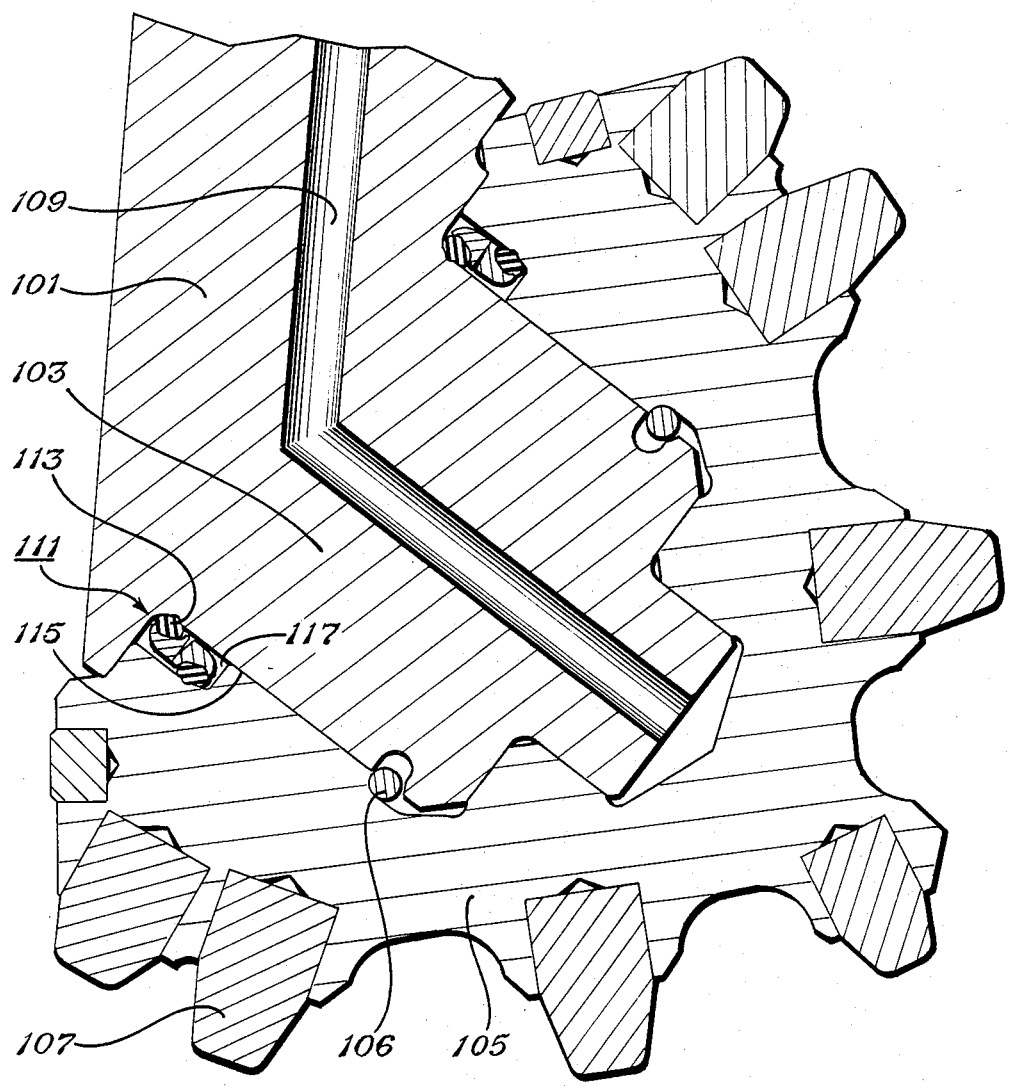
FIG. 7 is a fragmentary view in longitudinal section of the lower portion of an alternate embodiment of the invention.

While the embodiment of the invention disclosed above was that of the initial test, the commercial embodiment is expected to be closer to that shown in FIG. 7. The leg 101 includes an oblique cantilevered bearing shaft 103 that depends inwardly and downwardly to support a rotatable cutter 105 having earth disintegrating teeth 107. A lubricant passage 109 supplies lubricant to the bearing surfaces between the bearing shaft 103 and the cutter 105. A snap ring retainer 106, similar to that shown in U.S. Pat. No. 4,344,658 is used in place of the ball retainer shown in FIG. 1.

A seal assembly 111 retains lubricant and excludes borehole fluids. This seal assembly has the same configuration as assembly 23 of FIG. 3, however, the innermost energizer ring 113 engages directly the journal bearing cylindrical surface 115, rather than a seal seat insert 36. A seal seat configuration is provided similar to the seal seat 55 and inner circumferential wall 33 in the FIG. 3 embodiment. This reduces the diameter of the seal seat of FIG. 7, as compared to the diameter of the seal seat in FIG. 3. This reduction in diameter of the seal seat in relation to the diameter of journal bearing cylindrical surface 115 reduces the ratio of rigid ring movement to cutter movement. This ratio, determined by making a model similar to the one described in connection with the FIG. 3 embodiment, except using the FIG. 7 bearing configuration, is 1.28:1. The materials for the various components of the seal assembly are identical with the materials used in the embodiment of FIG. 1-FIG. 4 except both rigid rings are preferably constructed of the same hard metal alloy as ring 37.

While the invention has been shown in only two of its forms, it should be apparent to those skilled in the art that it is not thus limited, but is susceptible to various changes and modifications without departing from the spirit thereof.

I claim:

1. An earth boring bit with an improved pressure compensating face seal means, said bit comprising:
a body;
a cantilevered bearing shaft extending obliquely inwardly and downwardly from the body;
a cutter secured for rotation about the bearing shaft, with axial and radial play due to clearances;
a lubrication system in the body, including a hydrostatic pressure compensator;
a seal groove including a pair of oppositely facing circumferential walls, one located on the cutter and the other on the bearing shaft, each of which intersects a generally radial end wall;
a pair of rigid rings positioned in the seal groove to have opposed, sealing faces;
a pair of resilient energizer rings, each of which sealingly engages a respective one of the rigid rings, and continuously engages one of the oppositely facing circumferential walls of the seal groove to define a seal assembly positioned in between the end walls of the seal groove;
the seal assembly being positioned intermediate the end walls of the groove during assembly of the cutter on the bearing shaft and exposed to and moved radially by dynamic pressure differentials between the lubricant and the ambient drilling fluids;
the axial width of the engaged rigid rings and seal assembly being less than the axial, minimum width of the seal groove when the cutter is thrust outwardly on the bearing shaft to define at least one axial clearance to permit unrestricted axial movement of the rigid rings between the end walls of the groove when the cutter moves relative to the bearing shaft.

2. The invention defined by claim 1 wherein said axial clearance is greater than the maximum seal movement with respect to the bearing shaft less the axial play between cutter and shaft.

3. The invention defined by claim 2 wherein the circumferential portions of the seal groove and the opposed circumferential portions of the metal rings include annular seal seats to axially position the energizer rings and thus the rigid rings in predetermined positions in the seal groove during assembly of the cutter upon the shaft to have a first axial clearance at the inner end of the rigid rings and a second axial clearance at the outer end of the rigid rings, each clearance being greater than the maximum seal movement with respect to the bearing shaft less the axial play between cutter and shaft.

4. The invention defined by claim 3 wherein the first axial clearance is greater than the maximum seal movement with respect to the bearing shaft less the axial play between cutter and shaft, and the second axial clearance is greater than the maximum seal movement with respect to the shaft less the movement of the rigid rings which accompanies the maximum permissible axial movement of the cutter relative to the shaft in the absence of a pressure differential across the seal assembly.

5. An earth boring bit with an improved seal means and pressure compensating system, said bit comprising:
a body;
a cantilevered bearing shaft extending obliquely inwardly and downwardly from the body;
a cutter secured for rotation about the bearing shaft, with axial and radial play due to clearances;
a lubrication system in the body, including a hydrostatic pressure compensator;

a seal groove including a pair of an inclined, contoured and oppositely facing circumferential walls, one located on the cutter and the other on the bearing shaft, each of which intersects a generally radial end wall;

a pair of metal rings positioned in the seal groove and having opposed, sealing faces and inclined, contoured circumferential portions, which oppose, but are spaced radially from, the circumferential walls on the cutter and shaft;

a pair of O-ring type resilient energizer rings, each of which sealingly and continuously engages a respective one of the inclined, contoured walls of the seal groove and the opposed inclined, contoured portion of one of the metal rings to define a seal assembly positioned between the end walls of the seal groove;

the seal assembly being exposed to and biased axially by dynamic pressure differentials between the lubricant and the ambient drilling fluids;

the axial width of the engaged rigid rings and seal assembly being less than the axial, minimum width of the seal groove when the cutter is thrust outwardly on the bearing shaft to define at least one axial clearance to permit unrestricted axial movement of the rigid rings between the end walls of the groove when the cutter moves relative to the bearing shaft.

6. The invention defined by claim 5 wherein said axial clearance is greater than the maximum seal movement with respect to the bearing shaft less the axial play between cutter and shaft.

7. The invention defined by claim 6 wherein the circumferential portions of the seal groove and the opposed circumferential portions of the metal rings include annular seal seats to axially position the energizer rings and thus the rigid rings in predetermined positions in the seal groove during assembly of the cutter upon the shaft to have a first axial clearance at the inner end of the rigid rings and a second axial clearance at the outer end of the rigid rings, each clearance being greater than the maximum seal movement with respect to the bearing shaft less the axial play between cutter and shaft.

8. The invention defined by claim 7 wherein the first axial clearance is greater than the maximum seal movement with respect to the bearing shaft less the axial play between cutter and shaft, and the second axial clearance is greater than the maximum seal movement with respect to the bearing shaft less the movement of the rigid rings which accompanies the maximum permissible axial movement of the cutter relative to the shaft in the absence of a pressure differential across the seal assembly.

9. An earth boring bit with an improved seal means and pressure compensating system, said bit comprising:
a body;
a cantilevered bearing shaft extending obliquely inwardly and downwardly from the body;
a cutter secured for rotation about the bearing shaft, with axial and radial play due to clearances;
a lubrication system in the body, including a hydrostatic pressure compensator;
a seal groove including a pair of generally conical, contoured and oppositely facing circumferential walls, one located on the cutter and the other on the bearing shaft, each of which intersects a generally radial end wall;
a pair of metal rings positioned in the seal groove, each having a seal face with a radial, engaged portion and a tapered lubrication portion, and in addition, the pair of metal rings having oppositely facing, generally conical, contoured circumferential portions, which oppose, but are spaced radially from, the circumferential walls on the cutter and shaft;
a pair of O-ring type resilient energizer rings, each of which sealingly and continuously engages a respective one of the conical, contoured walls of the seal groove and the opposed conical, contoured portion of one of the metal rings to define a seal assembly positioned between the end walls of the seal groove;
the seal assembly being positioned intermediate the end walls of the groove during assembly of the cutter on the bearing shaft and exposed to and biased by dynamic pressure differentials between the lubricant and the ambient drilling fluids;
the axial width of the engaged rigid rings and the seal assembly being less than the axial, minimum width of the seal groove to define at least one axial clearance to permit unrestricted axial movement of the rigid rings between the end walls of the groove when the cutter moves relative to the bearing shaft.

10. The invention defined by claim 9 wherein said axial clearance is greater than the maximum seal movement with respect to the bearing shaft less the axial play between cutter and shaft.

11. The invention defined by claim 10 wherein the circumferential portions of the seal groove and the opposed circumferential portions of the metal rings include annular seal seats to axially position the energizer rings and thus the rigid rings in predetermined positions in the seal groove during assembly of the cutter upon the shaft to have a first axial clearance at the inner end of the rigid rings and a second axial clearance at the outer end of the rigid rings, each clearance being greater than the maximum seal movement with respect to the bearing shaft less the axial play between cutter and shaft.

12. The invention defined by claim 11 wherein the first axial clearance is greater than the maximum seal movement with respect to the bearing shaft less the axial play between cutter and shaft, and the second axial clearance is greater than the maximum seal movement with respect to the bearing shaft less the movement of the rigid rings which accompanies the maximum permissible axial movement of the cutter relative to the shaft in the absence of a pressure differential across the seal assembly.

* * * * *

UNITED STATES PATENT AND TRADEMARK OFFICE
CERTIFICATE OF CORRECTION

PATENT NO. : 4,516,641
DATED : May 14, 1985
INVENTOR(S) : BRUCE H. BURR

It is certified that error appears in the above-identified patent and that said Letters Patent is hereby corrected as shown below:

COL. 1, line 29, change "replaed" to --replaced--.

COL. 8, Claim 1, line 23, change "radially" to --axially--.

Signed and Sealed this

Thirty-first Day of May, 1988

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,516,641

DATED : May 14, 1985

INVENTOR(S) : Bruce H. Burr

It is certified that error appears in the above-identified patent and that said Letters Patent is hereby corrected as shown below:

Col. 4, lines 62-63, delete --68 being--.

Col. 5, line 23, delete --axial--.

Signed and Sealed this

Twenty-seventh Day of February, 1990

Attest:

JEFFREY M. SAMUELS

*Attesting Officer*   *Acting Commissioner of Patents and Trademarks*